United States Patent [19]

Anderson et al.

[11] Patent Number: 5,739,502

[45] Date of Patent: Apr. 14, 1998

[54] LASER INTENSITY REDISTRIBUTION

[75] Inventors: Thomas Edwin Anderson, Mason; Gail Robert Dearth, Cincinnati, both of Ohio; James George Kelley, Cold Springs, Ky.

[73] Assignee: General Electric Company, Cincinnati, Ohio

[21] Appl. No.: 565,508

[22] Filed: Dec. 27, 1983

[51] Int. Cl.⁶ .................................................. B23K 26/00
[52] U.S. Cl. ......................... 219/121.71; 219/121.6; 219/121.75; 359/94; 606/161; 148/565; 408/701
[58] Field of Search .................... 219/121 LA, 121 LG, 219/121 LK, 121 LL, 121 LR, 121.6, 121.71, 121.75; 332/7.51; 350/266, 273, 274; 359/894; 606/161; 148/565; 408/701

[56] References Cited

U.S. PATENT DOCUMENTS

| | | | |
|---|---|---|---|
| 3,534,462 | 10/1970 | Cruickshank et al. | 219/121 LT |
| 4,156,124 | 5/1979 | Mocken et al. | 219/121 LD |
| 4,467,171 | 8/1984 | Ramos | 219/121 LG |
| 4,480,168 | 10/1984 | Cielo et al. | 219/121 LR |

FOREIGN PATENT DOCUMENTS 0028789  7/1980  Japan ................ 219/121 LT

OTHER PUBLICATIONS

Toller, "Laser Drilling of AERO Engine Components", Nov. 1982, pp. 1–9. NTIS N84-22956/6.

*Primary Examiner*—Nelson Moskowitz
*Attorney, Agent, or Firm*—Andrew C. Hess; Nathan D. Herkamp

[57] ABSTRACT

A laser beam is shaped by eclipsing it with a mask of desired shape. The shaped beam is used to drill a hole corresponding to the shape of the beam.

2 Claims, 4 Drawing Sheets

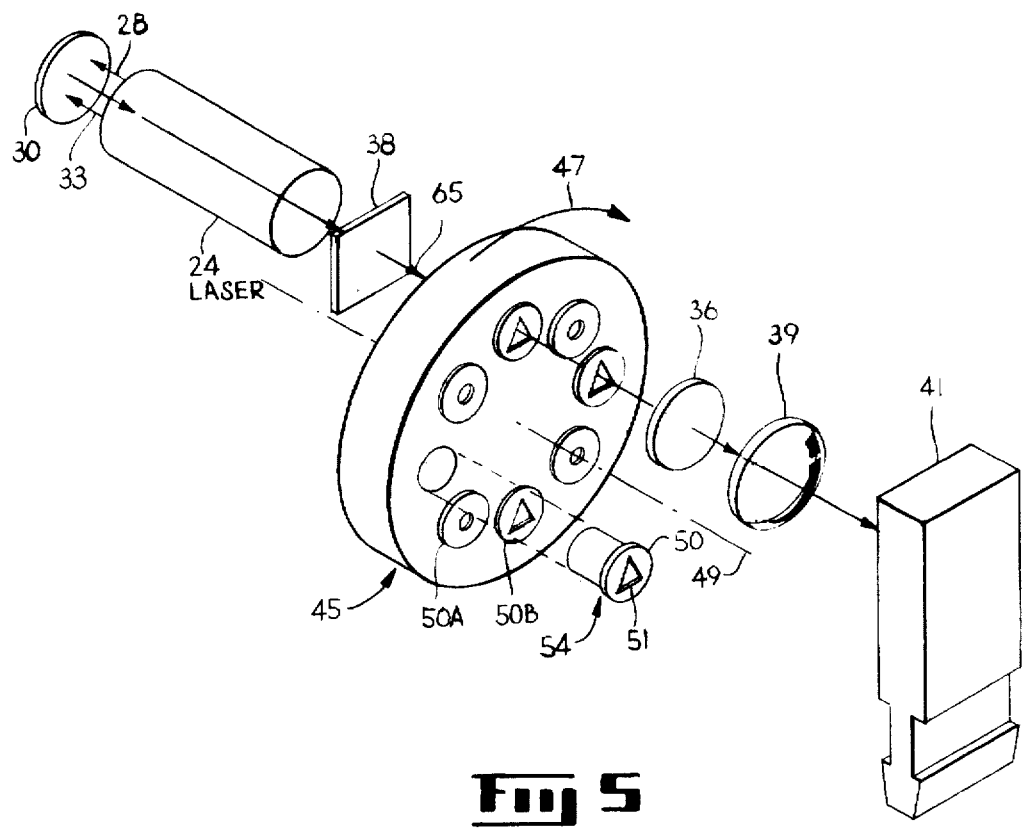
Fig 5
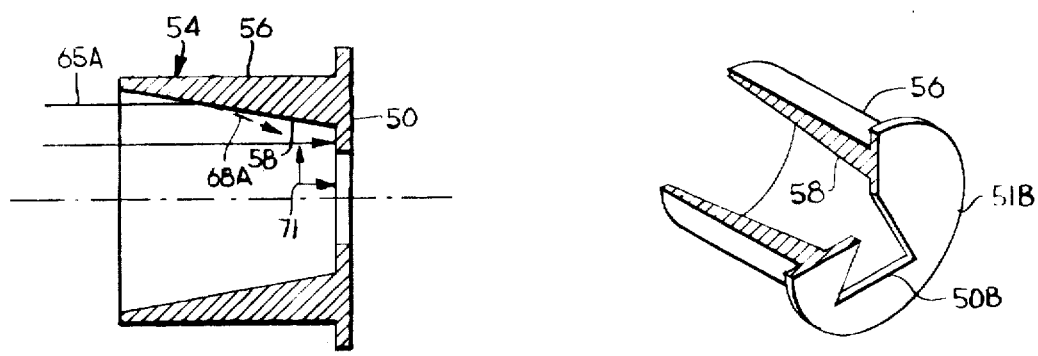
Fig 6
Fig 7
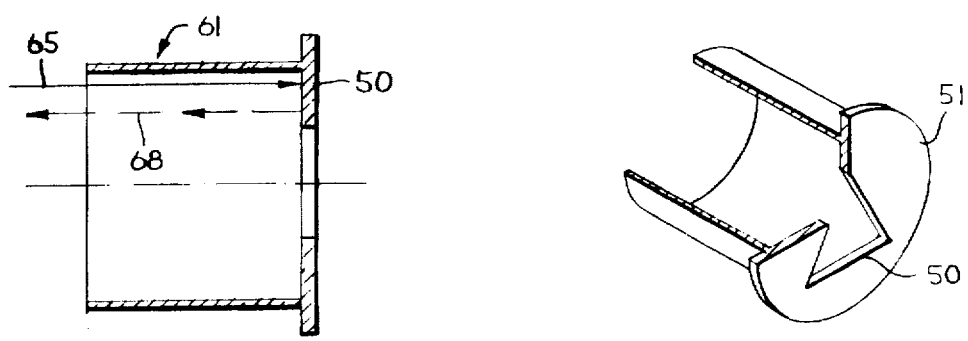
Fig 8
Fig 9

5,739,502

LASER INTENSITY REDISTRIBUTION

The present invention relates to the redistribution of the cross-sectional intensity pattern of laser light and, more particularly, to the utilization of such redistributions in the laser drilling of holes of controllable sizes and shapes, such as cooling holes in the blades of gas turbine engines.

BACKGROUND OF THE INVENTION

In a gas turbine engine, extremely hot gases produced in a combustor are ducted upon the blades of a turbine rotor in order to spin the rotor for the extraction of work from the gases. FIG. 1 illustrates one such turbine blade, but removed from its rotor. It is generally necessary to cool the blades in order to prevent infliction of damage upon them by the hot gases.

One method of cooling entails the transmission of cooling air 4 in FIG. 2 through internal passages 6 of the blade and venting the cooling air through holes 9 in FIGS. 1, 2, and 4, to supply a film 12 of cooling air for further cooling of the blade 3. FIG. 3 illustrates one of the holes 9 in enlarged view.

The hole 9 can be described as compound, in having two regions, namely an upstream region 15 and a downstream region 19. The upstream region 15 is generally cylindrical, while the downstream region 19 is somewhat tetrahedral. The downstream region 19 flares outward and provides an increasing cross-sectional area as the cooling air 12 travels downstream. The increasing cross-sectional area functions as a diffuser which reduces the velocity of the cooling airstreams 12 in FIGS. 3 and 4 and thus inclines the airstreams 12 to cling to the surface 21 of the blade 3, rather than to separate from the surface 21 as shown by phantom arrow 23 in FIG. 4, thereby promoting better cooling of the blade 3.

A common approach to drilling compound holes such as holes 9 in FIG. 3 is to use electron discharge machining (EDM). In such machining, an electrode having a shape matching that of the hole to be formed is supplied with a different electrical potential than the material to be drilled. When the two come into contact, electrolysis eats away the blade material, thus forming a hole having a shape similar to that of the electrode. However, in the EDM process, the electrode is ultimately consumed, necessitating its replacement. This replacement slows the EDM process.

OBJECTS OF THE INVENTION

It is an object of the present invention to provide a new and improved method of laser drilling.

It is a further object of the present invention to provide a new and improved method of laser drilling of holes of compound shape.

It is further object of the present invention to provide a new and improved method of drilling diffusing passageways in the cooling holes of gas turbine engine blades.

SUMMARY OF THE INVENTION

The present invention concerns the use of a laser to drill holes of noncylindrical shape and, in particular, holes of compound shape wherein one region of the hole has a first configuration and a second region of the hole has a second configuration.

BRIEF DESCRIPTION OF THE DRAWINGS

FIG. 5 illustrates one form of the present invention, used to drill the hole of FIG. 3.

FIGS. 6-9 illustrate masks used to shape the laser beam of the present invention.

DETAILED DESCRIPTION OF THE INVENTION

Figure 1:
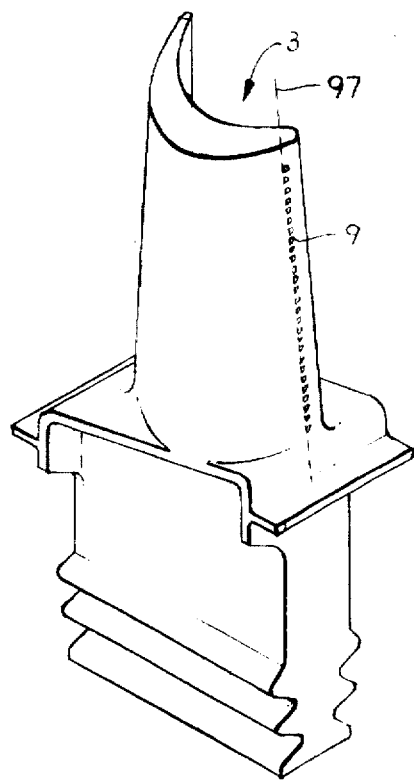
FIG. 1 illustrates a gas turbine engine blade.
Figure 2:
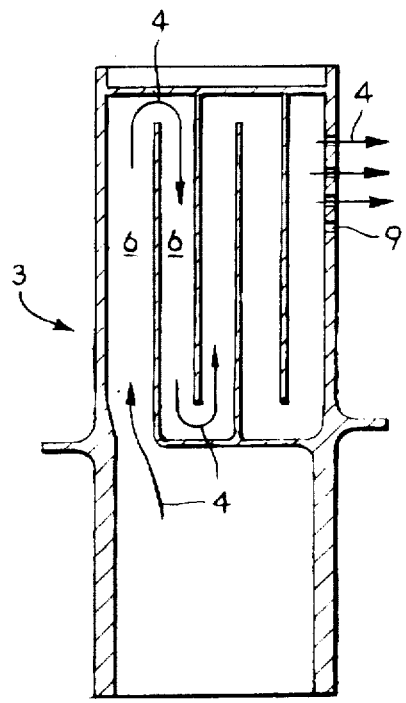
FIG. 2 illustrates cooling passages contained within the blade of FIG. 1.

FIG. 5 illustrates a laser 24 which provides a laser beam 28 which impinges upon a high reflectance mirror 30, is returned to the laser cavity (not specifically shown) as beam 33, through which cavity the laser beam 33 travels to a high transmissivity mirror 36. The laser beam passes through the high transmissivity mirror 36, to a beam expander 38 which expands the laser beam to twice its diameter, to a lens system schematically shown as plano convex lens 39, and thence to an object 41 to be drilled.

The components just described are known in the art. The laser 24 is preferably a ruby laser, such as Model No. PD-460, available from Raytheon Corp., located in Boston, Mass. High reflectance mirror 30 is preferably one having reflectivity in excess of 98% and high transmissivity mirror 36 preferable has a transmissivity exceeding 66%. Both mirrors are commonly supplied with the laser as purchased from Raytheon Corp.

Figure 10:
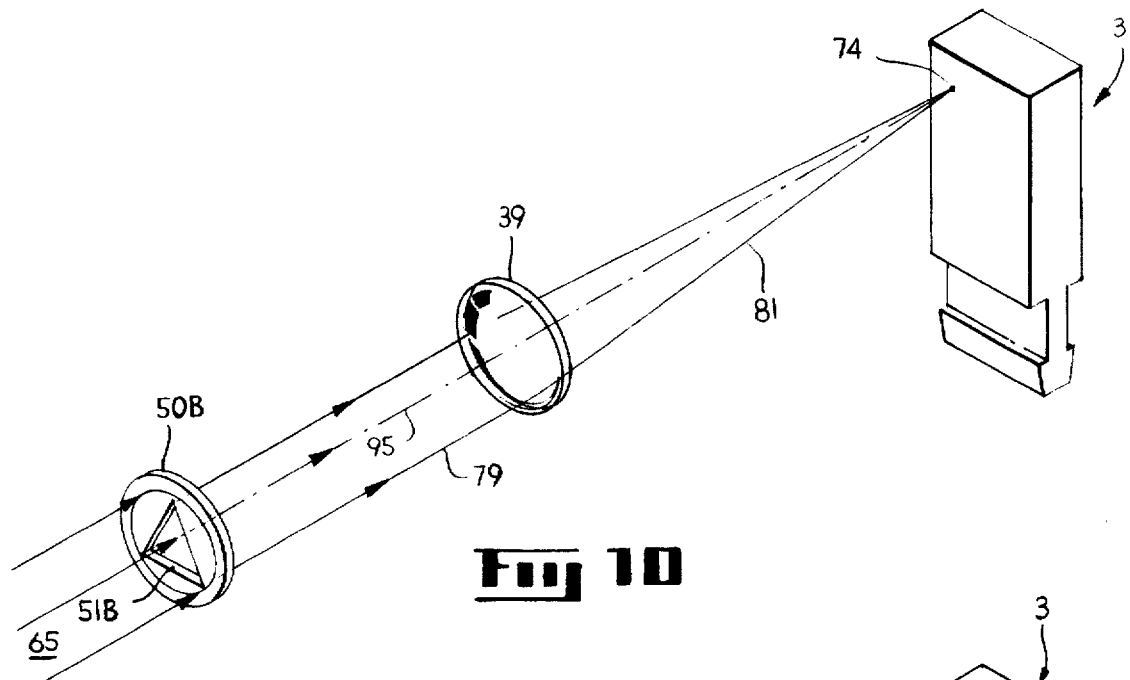
FIGS. 10-13 illustrate the focusing of a laser beam onto a blade.
Figure 11:
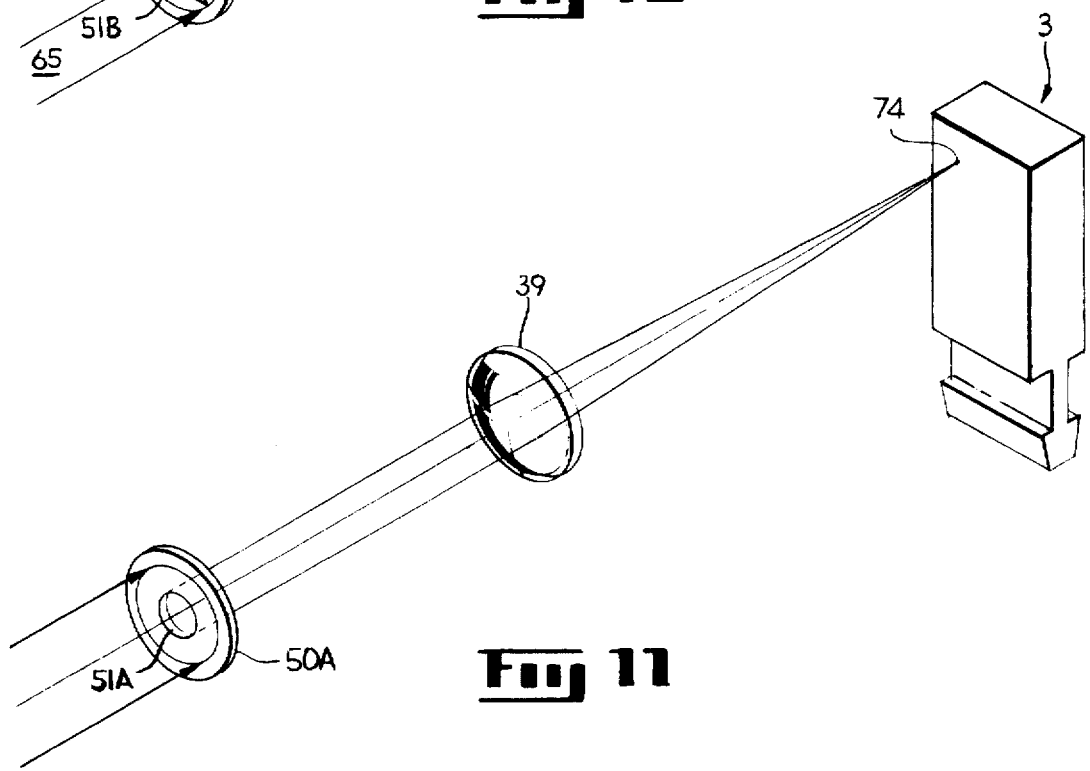

A turret 45 which is rotatable in the direction of arrow 47 about axis 49 supports a plurality of masks 50, each mask comprising an aperture such as aperture 51 having a given size and shape. The turret 45 is positioned between the laser 24 and the high transmissivity mirror 36. As shown in FIG. 11, a particular mask 50A contains a circular aperture 51A, and as shown in FIG. 10, mask 50B has a triangular shaped aperture 51B.

The masks 50 in FIG. 5 are supported by mask supports 54 in FIGS. 6 and 7 which have a generally cylindrical outer surface 56 and a generally conical inner surface 58. This mask support configuration is in distinction to one possible alternative, namely, a cylindrical ring support such as ring 61 in FIG. 8 supporting a mask 50.

This latter ring support 61 allows retro-reflection of laser light beam 65 toward the laser 24 in FIG. 5 as beam 68 in FIG. 8. In contrast, the conical inner surface 58 in FIG. 6 reflects an incoming laser beam 65A away from the laser 24 as shown by laser beam 68A. The retro-reflection of laser beam 68 in FIG. 8 back to the laser 24 in FIG. 5 can provide objectionable positive feedback to the lasing system and, in some cases, cause damage to the laser. The conical inner surface 58 in FIG. 6 of the present invention allows the interposition of a generally planar mask 50 in FIGS. 5 and 6 in the path of laser beam 65, normal to the laser beam 65 (that is, angle 71 in FIG. 6 is 90°), yet without substantial retro-reflection of the laser beam to the laser.

The laser beam striking the mask is eclipsed by the mask and acquires a cross-sectional shape determined by the shape of the mask. Plainly, the laser beam 65 eclipsed by triangular mask 50B in FIG. 10 will acquire a triangular cross section and a laser beam eclipsed by circular mask 50A in FIG. 11 will acquire a circular cross section. The laser beam is then focused by lens system 39 to a focal point 74. The intensity of radiation at focal point 74 can be quite large.

For example, when the ruby laser identified above is driven by a 10-joule pulse provided by a xenon flash lamp, the energy intensity at focal point 74 is sufficient to burn a hole into the blade 3 in FIGS. 10 and 11. The present invention utilizes this feature in the following manner.

Figure 12:
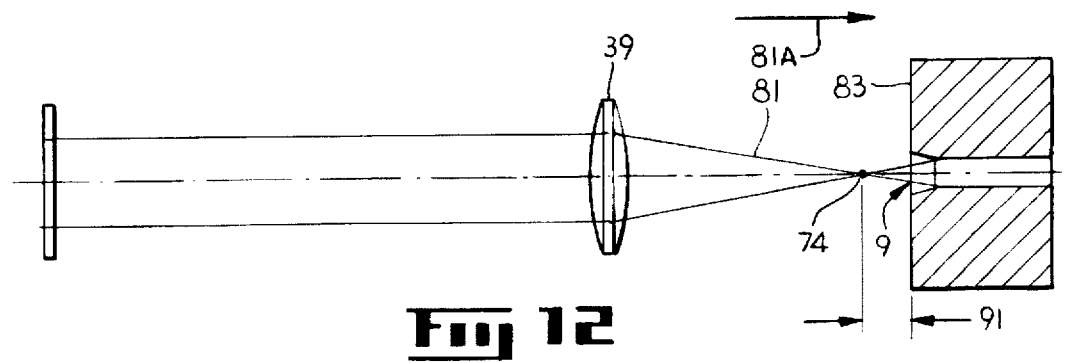

The turret 45 in FIG. 5 is rotated so that a circular mask 50A of desired diameter eclipses the laser beam 65 and a cylindrical hole 77 in FIG. 12 is drilled into the blade 3. When the cylindrical hole has reached a desired depth, the turret 45 is rotated and the triangular mask 50B is now used to eclipse the laser beam 65. The triangular mask 50B produces a laser beam 79 in FIG. 10 which is triangular in cross section, and also pyramidal in three-dimensional shape when focused by lens 39 as shown by pyramidal beam 81.

Figure 13:
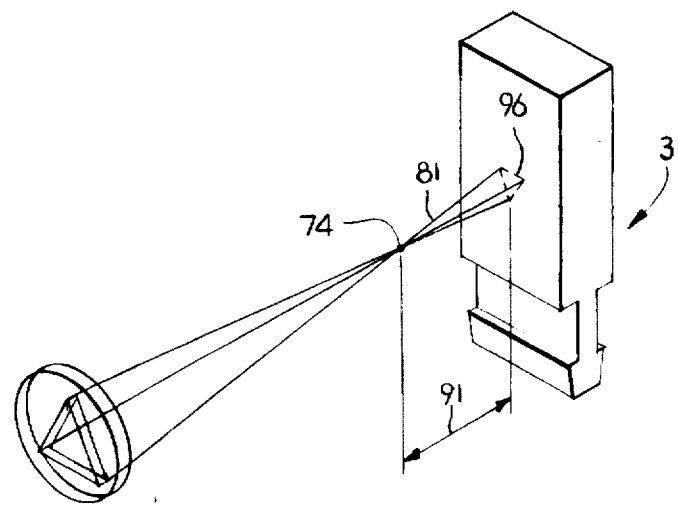
Figure 14:
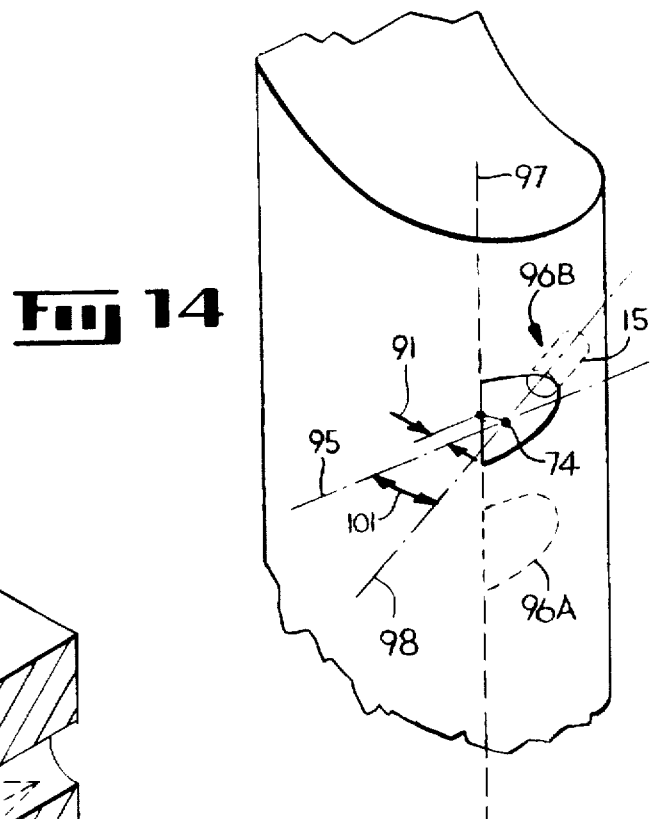
FIG. 14 illustrates alignment of the cutting laser beam with the blade.

The lens system 39 focuses the triangular-pyramidal laser beam 81 to a focal point 74. The surface 83 of the blade 3 is moved away from the focal point 74 and the lens 39, as shown in FIG. 12. In the case of a lens system 39 having a 6-inch focal length, and using the above-identified ruby laser, the surface 83 on the blade 3 is moved approximately 0.800 inches to 0.900 inches, which is dimension 91. Under these circumstances, the laser beam 81 is diverging when it strikes the blade surface 83 (the cross-sectional shape of the laser beam 81 when striking the blade 3 is shown by phantom triangle 96 in FIG. 13. Dimension 91 is exaggerated for case of illustration.). In addition, the axis 95 of the laser beam in FIG. 10 is rotated about point 74 in FIG. 14 so that the axis 95 intersects the axis 98 of the cylindrical region 15 at an angle of about 4 to 8 degrees, which is angle 101. Further, the triangular mask is aligned so that the phantom triangle 96 in FIG. 13 is projected as shown in FIG. 14, wherein the base 96A of the phantom triangle 96 is parallel with dashed radial line 97 (shown also in FIG. 1). With such alignment, a diffuser 96B is cut as shown in FIG. 14. Furthermore, the energy intensity (in joules per sq inch) of the laser beam within the phantom triangle 96 is less than that which will exist at the focal point 74 because the focal point 74 has a smaller cross-sectional area.

Figure 15:
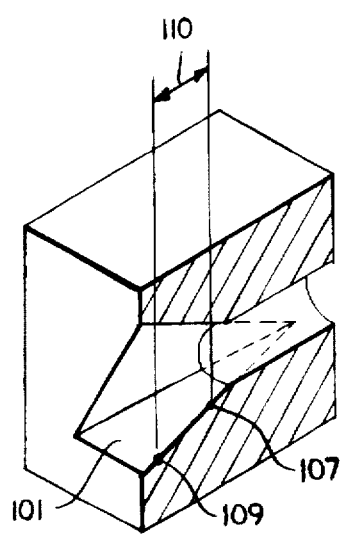
FIG. 15 illustrates part of a hole cut by the present invention.

After the blade 3 has been moved away from focal point 74, the laser is fired a sufficient number of times to achieve the shape and depth of the hole desired. Under the circumstances just described, a generally pyramidal diffuser 101 in FIGS. 13 and 15 is generated.

One important aspect of the present invention includes the predetermined and intentional use of a specific region of the laser beam (in the embodiment just described, this is the phantom region 96 in FIG. 13), for cutting a noncircular, shaped hole, and further, that this specific region is one other than the focal point region. In being other than the focal point region, it has an energy intensity (in terms of unit energy per unit area) which is less than that of the focal region. Keeping the focal point 74 out of the hole protects the hole from scarfing by the intense heat of the focal point 74.

Figure 3:
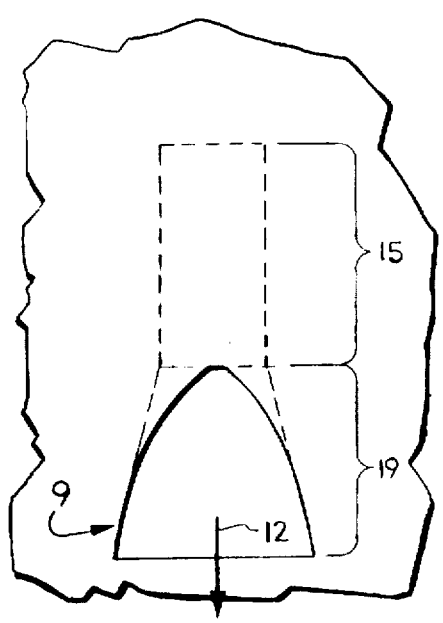
FIG. 3 illustrates one of the holes 9 in the blade of FIG. 1.
Figure 4:
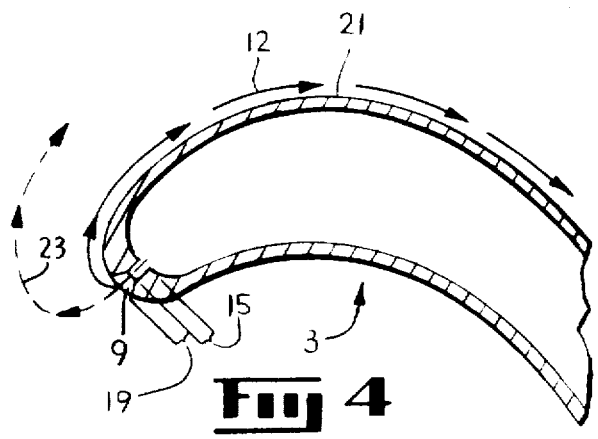
FIG. 4 illustrates a cooling airstream exiting the hole of FIG. 3.

One embodiment of the present invention has been described, which produces a diffusing aperture in downstream region 19 in FIG. 3 which connects to a cylindrical hole in upstream region 15 for cooling of gas turbine engine blades.

Applicants have found that, despite the fact that the laser beam 81 in FIG. 12 is diverging as it travels in direction 81A, the diffuser cut by it is converging in the same direction. That is, while the cross-sectional area of laser beam 81 increases in the direction of arrow 81A, the diffuser 9 which is cut by it decreases in cross-sectional area in the direction of arrow 81A. Applicants theorize that the walls of the diffuser act as an optical waveguide during cutting, and that the molten metal produced by the cutting operation funnels the laser light in a complex manner not fully understood, to produce the diffuser of the shape shown in FIG. 3.

Numerous substitutions and modifications can be undertaken without departing from the true spirit and scope of the present invention as defined in the following claims. What is desired to be secured by Letters Patent of the United States is the following.

We claim:

1. A method of drilling compound holes, comprising the following stesp:

(a) drilling a pilot hole using a laser beam having a first, generally conical, shape.

(b) enlarging at least part of the pilot hole by using a laser beam having a second, generally pyrimidal, shape.

2. A method of drilling cooling holes in a turbine blade, the holes having a first, upstream, region of generally cylindrical shape, and a second, downstream, diffusing region of generally pyramidal shape, comprising the following steps:

(a) forming the first region by passing a laser beam through a generally circular mask to provide a laser beam of generally circular cross section of predetermined diameter;

(b) focusing the first laser beam such that the focal point is positioned at a predetermined depth in the blade;

(c) drilling a hole to a predetermined depth using the first laser beam;

(d) forming the second region by passing a laser beam of generally triangular cross section of predetermined dimension;

(e) focusing the second laser beam such that the focal point is positioned at a predetermined depth in the blade; and (f) enlarging one region of the hole using the second laser beam such that a generally pyramidal diffuser is formed.

* * * * *